G. ANDROSS.
SPECTACLES.

No. 182,013. Patented Sept. 12, 1876.

Witnesses.
John L. Peters
Geo. D. Jewell

Inventor.
George Andross
by Theo. G. Ellis, Attorney

UNITED STATES PATENT OFFICE.

GEORGE ANDROSS, OF HARTFORD, CONNECTICUT.

IMPROVEMENT IN SPECTACLES.

Specification forming part of Letters Patent No. 182,013, dated September 12, 1876; application filed April 29, 1876.

*To all whom it may concern:*

Be it known that I, GEORGE ANDROSS, of Hartford, in the county of Hartford and State of Connecticut, have invented certain new and useful Improvements in Spectacles; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention relates to spectacles or glasses that are worn as aids to vision; and it has for its object a more convenient and secure method of supporting the lenses than has heretofore been used.

My invention consists in the novel construction and arrangement of the "bows" or frames for holding the lenses, and supporting them in their proper position before the eyes of the wearer.

Heretofore all spectacles and double eye-glasses have been constructed with a connection between the two lenses, which is designed to rest upon or clasp the bridge of the nose. This is frequently the cause of injury, particularly when the nose is clasped by a spring to hold on the glasses. Besides the external disfigurement generally caused, the lachrymal ducts are sometimes irritated and diseased by the continued pressure, causing great pain and annoyance.

By means of my invention this connection between the lenses is dispensed with.

Figure 1:
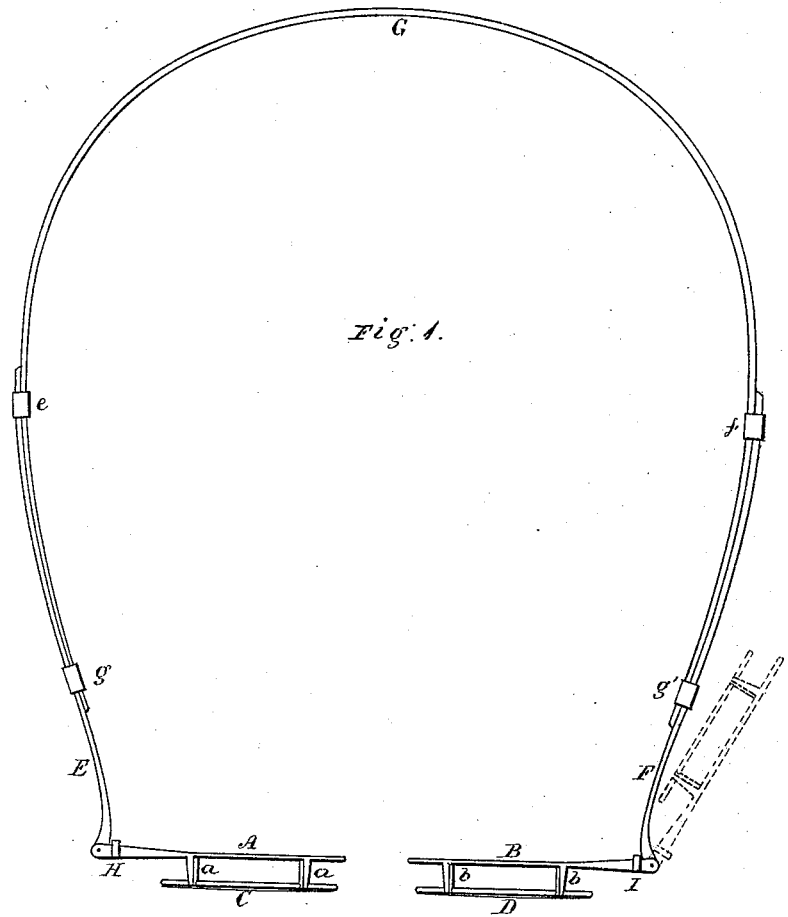
Figure 2:
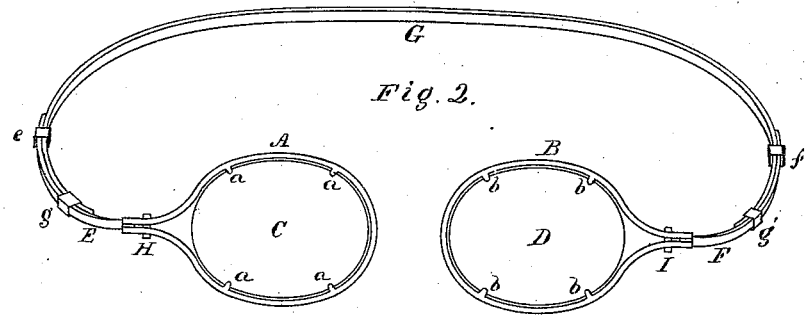

In the accompanying drawing, Figure 1 is a top view of my improved spectacles. Fig. 2 is a front view of the same.

A and B are the frames for holding the lenses C and D. These frames are hinged to the side bars E and F, which extend to $e$ and $f$, where they are furnished with bands, embracing the spring-bar G.

The spring-bar G passes around the back of the head, and extends to $g$ $g'$, where it has bands embracing the side bars E and F. These bands form slides, in the usual manner, and are for the purpose of adjustment to different heads. The bar G is made to spring inward, so as to press the parts A and B together, and hold the whole securely upon the head of the wearer.

The frames A and B are provided with studs $a$ $a$ $b$ $b$, which support the lenses some distance in front of the frames, as shown in the drawing, so that they are prevented from coming in contact with the lids or lashes of the eye.

In order to secure a firm and even bearing in the joints between the frames of the lenses and the side bars, the two ends of the frame, which embrace the end of the side bar, and through which passes the rivet, forming the hinge, are pressed together by means of the clip H or I, which gives a spring-pressure upon the joint, and allows for wear.

My improved spectacles are worn, when in use, in the position shown by the full lines in the figures; but when it is wished to dispense temporarily with the glasses, they can be turned outward away from the eyes to the position shown by the dotted lines on the right of Fig. 1.

By means of my invention all the evils of the bridge over the nose are avoided, and the glasses are held in place more securely than by any other method. They cannot fall off accidentally, as is the case with other forms of spectacles, but can easily be turned aside when desired.

What I claim as my invention is—

1. The combination of the frames A B and the lenses C D with a spring-band passing around the head, when constructed and arranged so that the frames and lenses turn outwardly around to the side of the head, away from the eyes, when desired, substantially as herein set forth.

2. The frames A and B, provided with the studs $a$ $a$ $b$ $b$, for holding the lenses of spectacles, substantially as described.

3. The combination of the clip H with the joint formed by the frame A and the side bar E, the whole being constructed and arranged substantially in the manner herein described.

GEORGE ANDROSS.

Witnesses:
 THEO. G. ELLIS,
 JOHN T. PETERS.